(12) United States Patent
Watanabe et al.

(10) Patent No.: US 7,658,414 B2
(45) Date of Patent: Feb. 9, 2010

(54) FUEL TANK FIXING STRUCTURE

(75) Inventors: Hideo Watanabe, Saitama (JP);
Yoshinobu Terada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 505 days.

(21) Appl. No.: 11/388,685

(22) Filed: Mar. 23, 2006

(65) Prior Publication Data

US 2006/0214416 A1    Sep. 28, 2006

(30) Foreign Application Priority Data

Mar. 25, 2005   (JP)  ............... P. 2005-088521

(51) Int. Cl.
*B60K 15/063* (2006.01)
(52) U.S. Cl. ..................................... 280/834
(58) Field of Classification Search ............... 280/830, 280/834
See application file for complete search history.

(56) References Cited

U.S. PATENT DOCUMENTS

| 2,622,887 | A | * | 12/1952 | Prior ......................... 280/833 |
| 2,758,845 | A | * | 8/1956 | Doyle et. al. ................ 280/834 |
| 5,186,324 | A | * | 2/1993 | Brandon, Jr. ................ 206/223 |
| 5,992,885 | A | * | 11/1999 | Fukagawa et al. .......... 280/830 |
| 2006/0061081 | A1 | * | 3/2006 | Kresse et al. ............... 280/834 |

FOREIGN PATENT DOCUMENTS

| JP | 59070231 A | * | 4/1984 |
| JP | 5096962 | | 4/1993 |
| JP | 5229353 | | 9/1993 |
| JP | 2005-231582 | | 9/2005 |

* cited by examiner

*Primary Examiner*—Kevin Hurley
(74) *Attorney, Agent, or Firm*—Fish & Richardson P.C.

(57) ABSTRACT

A fuel tank fixing structure for a low-profile fuel tank is provided with a plate-shaped attachment member formed so as to fit the fuel tank. The plate-shaped attachment member is brought into contact with the fuel tank at least at a part of a lower wall of the fuel tank and a part of a side wall of the fuel tank, and fixed to an underside portion of the vehicle body.

22 Claims, 5 Drawing Sheets

FUEL TANK FIXING STRUCTURE

The present invention claims foreign priority to Japanese patent application No. 2005-088521, filed on Mar. 25, 2005, the subject matter of which is incorporated herein by reference.

BACKGROUND OF THE INVENTION

1. Field of the Invention

The present invention relates to a fuel tank fixing structure for a low-profile fuel tank fixed to an underside portion of a vehicle body.

2. Description of the Related Art

The structures disclosed in Japanese Patent Unexamined Publications JP-A-5-96962 and JP-A-5-229353 is known as a structure for fixing a fuel tank to an underside portion of a vehicle-body.

In the structure disclosed in JP-A-5-96962, locking members are provided at both ends of two support bands laid in parallel along the underside of a fuel tank, and this locking member is inserted into an opening of a band fixing part fixed to a cross member of a car body, whereby the locking member is fitted to a fitting part.

Further, in the structure disclosed in JP-A-5-229353, a flange protrusively formed in the periphery of a fuel tank is superimposed on the upper surface of a bracket fixed to a side member of a car body, and the bracket and the flange are fastened by a bolt.

However, in the structure disclosed in JP-A-5-96962, since the underside of the fuel tank is supported by only the support bands, in case that external force is applied to the fuel tank in crash of a vehicle, there is possibility that the fuel tank will slide in the parallel direction to the support bands and move.

Further, in the structure disclosed in JP-A-5-229353, since only the flange located in the periphery of the fuel tank is fixed to the bracket on the body side, in case that the fuel tank is formed of synthetic resin in the thin shape, there is possibility that the intermediate portion of the fuel tank will be weighed down with the weight of fuel.

SUMMARY OF THE INVENTION

It is an object of the present invention to surely fix a fuel tank to an underside portion of a vehicle body.

In order to achieve the above object, according to a first aspect of the present invention, it is preferable that a fuel tank fixing structure for a low-profile fuel tank include a plate-shaped attachment member formed so as to fit the fuel tank. The plate-shaped attachment member is brought into contact with the fuel tank at least at a part of a lower wall of the fuel tank and a part of a side wall of the fuel tank, and fixed to an underside portion of a vehicle body.

Therefore, even when the external force is applied to the fuel tank due to crash of a vehicle, compared with the case where the conventional fixing band is used, not only the movement of the fuel tank can be prevented surely, but also the degree of freedom in position where the plate-shaped member is provided increases.

According to a second aspect of the present invention, as set forth in the first aspect of the present in invention, it is preferable that a coupling portion be formed by coupling the upper wall and the lower wall at an intermediate portion of the fuel tank, and the plate-shaped attachment member be brought into contact with the fuel tank at a circumference of the coupling portion. Further, the plate-shaped attachment member is fixed to the underside portion of the vehicle body with a bolt penetrating both the plate-shaped attachment member and the coupling portion.

Therefore, it is possible to effectively suppress such the deformation that the distance between the upper wall and the lower wall of the fuel tank increases or decreases due to variation of internal pressure. Further, it is possible to prevent the intermediate portion of the fuel tank from being weighed down with the weight of fuel.

According to a third aspect of the present invention, as set forth in the first aspect of the present in invention, it is preferable that the plate-shaped attachment member include an underside support part that comes into contact with the lower wall at a corner of the fuel tank, a side support part that comes into contact with two side walls of the fuel tank adjacent to each other, and a flange part. The plate-shaped attachment member is fixed to the underside portion of the vehicle body with a bolt penetrating the flange part.

According to a forth aspect of the present invention, as set forth in the second aspect of the present in invention, it is preferable that the plate-shaped attachment member include an annular underside support part that comes into contact with the lower wall of the fuel tank at the circumference of the coupling portion, a conical side support part that comes into contact with the coupling portion, and a ceiling wall that blocks the upper end of the conical side support part. The plate-shaped attachment member is fixed to the underside portion of the vehicle body with a bolt penetrating the ceiling wall.

According to a fifth aspect of the present invention, as set forth in the first aspect of the present in invention, it is preferable that the underside portion of the vehicle body include a body frame to which the plate-shaped attachment member is fixed.

According to a sixth aspect of the present invention, as set forth in the first aspect of the present in invention, it is preferable that the underside portion of the vehicle body include an attachment bracket to which the plate-shaped attachment member is fixed, and a floor panel to which the attachment bracket is fixed at an undersurface thereof.

According to a seventh aspect of the present invention, as set forth in the first aspect of the present in invention, it is preferable that the fuel tank fixing structure for a low-profile fuel tank further include a cushioning member for suppressing a transmission of a vibration to or from the fuel tank.

According to an eighth aspect of the present invention, as set forth in the seventh aspect of the present in invention, it is preferable that the cushioning member be interposed between the upper wall of the fuel tank and a floor panel of the vehicle body.

According to a ninth aspect of the present invention, as set forth in the ninth aspect of the present in invention, it is preferable that the cushioning member be interposed between the fuel tank and the plate-shaped attachment member.

According to a tenth aspect of the present invention, it is preferable that a low-profile fuel tank for a vehicle include a coupling portion formed by coupling an upper wall of the fuel tank and an lower wall of the fuel tank, the coupling portion being provided with an opening.

According to an eleventh aspect of the present invention, it is preferable that a vehicle include a low-profile fuel tank and a fuel tank fixing structure according to the first aspect of the present invention.

DETAILED DISCRIPTION OF THE PREFERRED EMBODIMENT

An embodiment according to the present invention will be described below with reference to the drawings.

First of all, a first plate-shaped attachment member 17 and a second plate-shaped attachment member 18 in the embodiment correspond to the plate-shaped attachment member of the present invention, and a body frame 19 and an attachment bracket 21 in the embodiment correspond to the underside portion of the vehicle body of the present invention.

FIGS. 1 to 5 show the embodiment of the invention.

Figure 1:
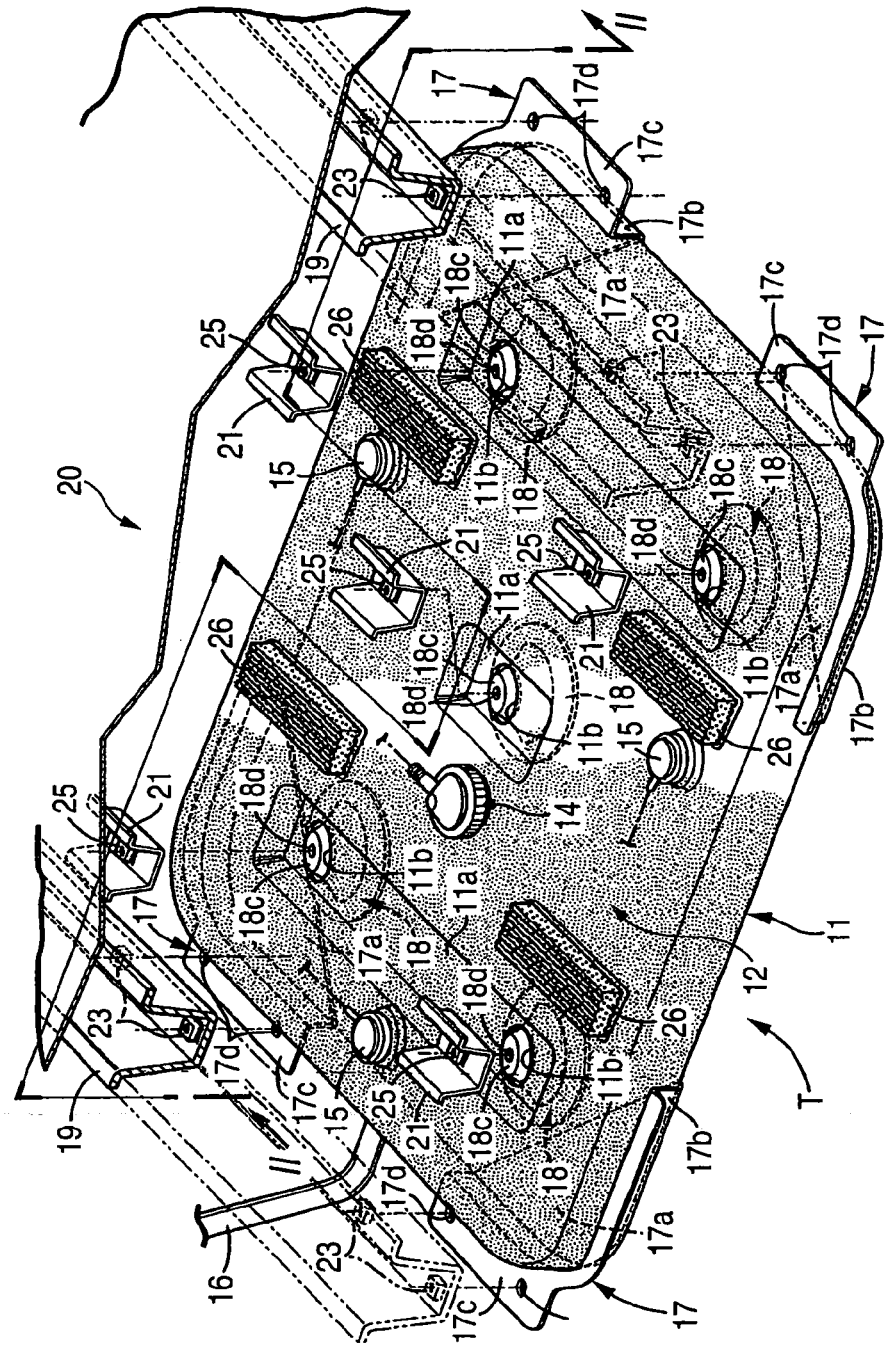
FIG. 1 is a perspective view of a vehicle fuel tank.
Figure 2:
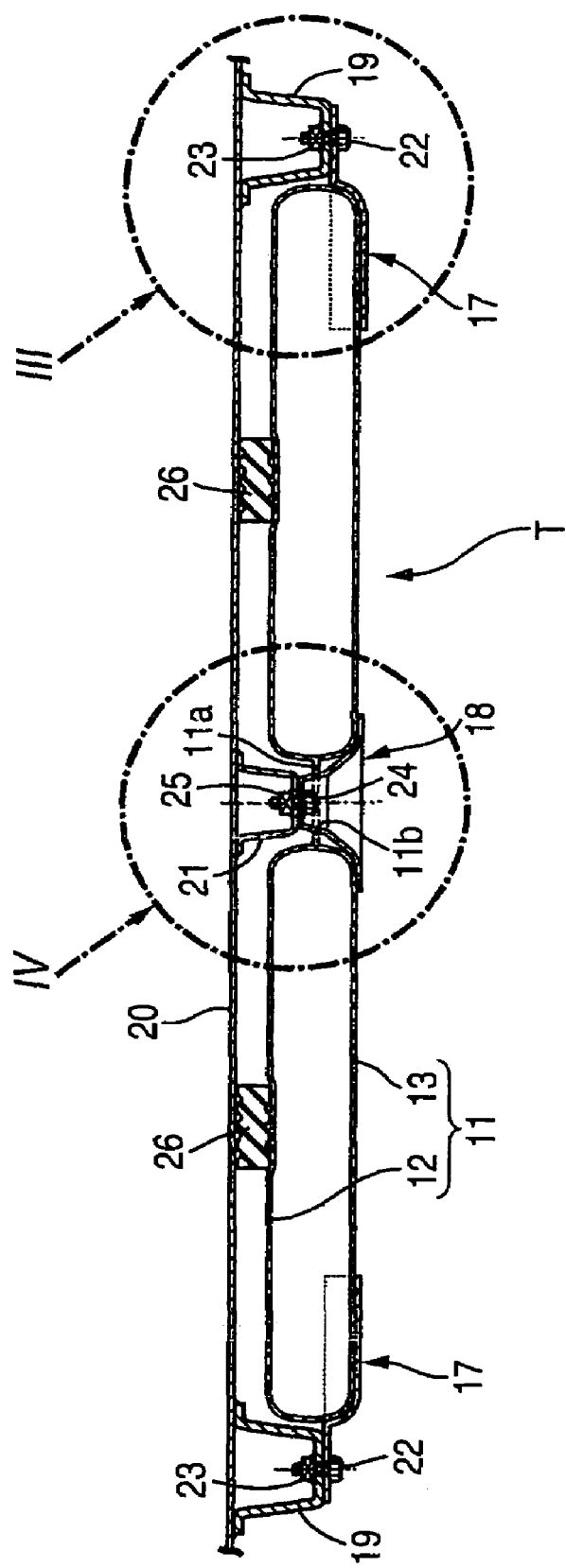
FIG. 2 is a sectional view taken along a line II-II in FIG. 1.

As shown in FIGS. 1 and 2, a tank body 11 of a vehicle fuel tank T is integrally formed of synthetic resin. Compared with the conventional fuel tank, the tank body 11 is formed so as to be low-profiled or substantially flat-shaped in a horizontal direction. In the intermediate portion of the tank body 11, coupling portions 11a are formed in plural positions (five positions in the embodiment). Each coupling portion 11a is formed by bringing an upper wall 12 and a lower wall 13 of the tank body 11 close to each other and integrally coupling them. In the center of each coupling portion 11a, a circular opening 11b is formed (five circular openings 11b are formed in the embodiment). For the upper wall 12 of the tank body 12, there are provided a fuel pump unit 14 for supplying fuel to an engine, and plural (three in the embodiment) evaporation fuel exhausting parts 15 for exhausting evaporation fuel to a canister. Further, to a side portion of the tank body 11, a lower end of a filler tube 16 for filling the fuel is connected.

In the tank body 11, its four corners are fixed through four first plate-shaped attachment members 17 onto the underside of a body frame 19, and its intermediate portion is fixed through five second plate-shaped attachment members 18 onto the underside of attachment brackets 21 welded to the undersurface of a floor panel 20.

Figure 3:
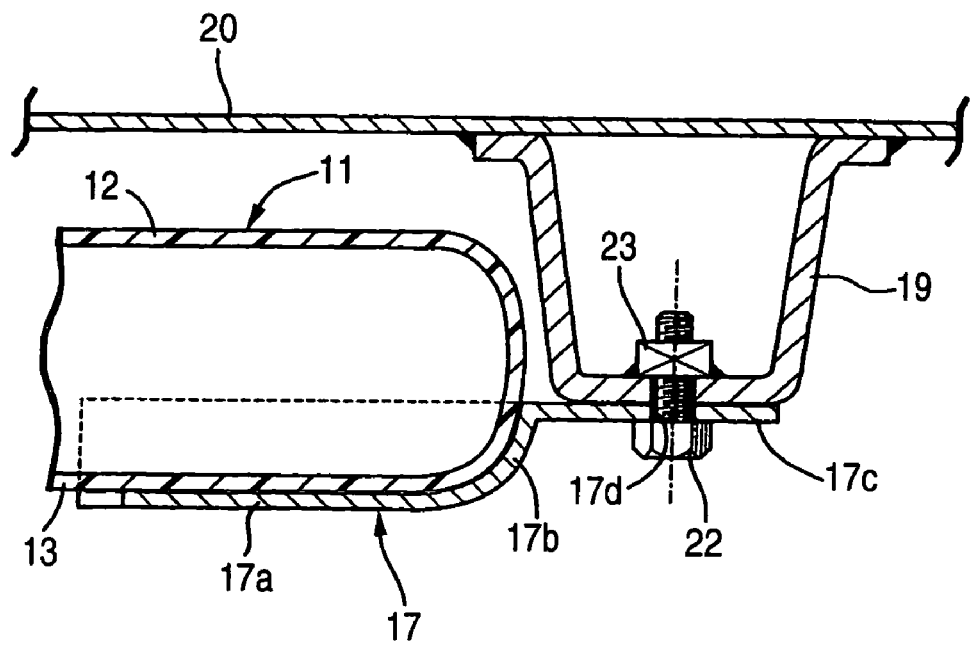
FIG. 3 is an enlarged view of a portion III in FIG. 2.
Figure 4:
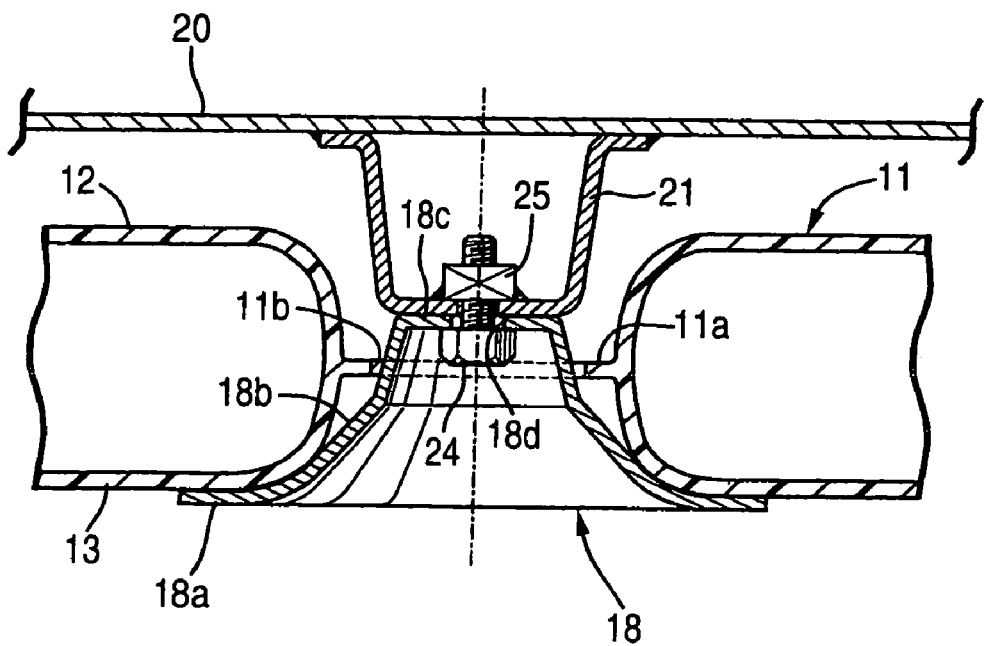
FIG. 4 is an enlarged view of a portion IV in FIG. 2.
Figure 5:
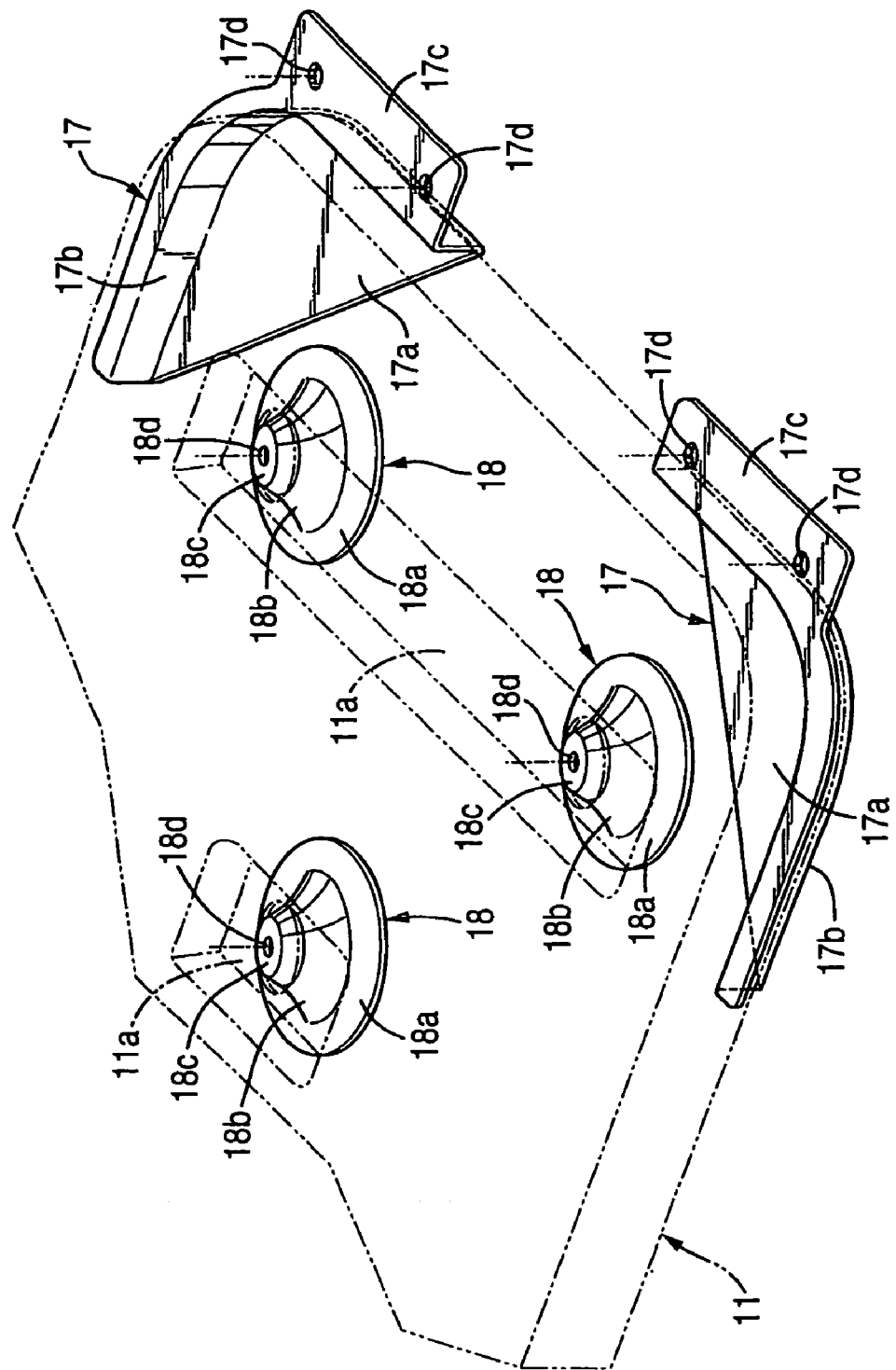
FIG. 5 is a partially enlarged view of the fuel tank.

As clear from FIGS. 3 and 5, all the four first plate-shaped attachment members 17 formed respectively by pressing a metal plate have the same structure. Each first plate-shaped attachment member 17 includes a triangle-shaped underside support part 17a that comes into contact with the corner underside of the tank body 11, a side support part 17b that curves in the shape of an arc and comes into contact with two side walls of the tank body 11 that are adjacent to each other, and a flange part 17c extending from the upper end of the side support part 17b. In the flange part 17c, two bolt holes 17d and 17d are formed, and bolts 22, 22 penetrating these bolt holes 17d, 17d from the downside to the upside penetrate the body frame 19 and are fastened by nuts 23, 23.

All the five second plate-shaped attachment members 18, which are formed respectively by pressing a metal plate in the shape of a fannel, have the same structure. The second plate-shaped attachment members 18 fit into the openings 11b from the downside of the coupling portions 11a. The second plate-shaped attachment member 18 includes a underside support part 18a that is annular and comes into contact with the underside around the opening 11b of the tank body 11, a side support part 18b that extends conically from the underside support part 18a upward and comes into contact with an inner side wall of the tank body 11 at the opening 11b, and a ceiling wall 18c that blocks the upper end of the side support part 18b. A bolt 2A penetrating a bolt hole 18d formed in the ceiling wall 18c from the downside to the upside penetrates the attachment bracket 21 welded to the underside of the floor panel 20, and is fastened by a nut 25.

When the fuel tank T is fixed onto the underside of the floor panel 20 by the four first plate-shaped attachment members 17 and the five second plate-shaped attachment members 18, plural (four in the embodiment) rubber-made cushioning members 26 are interposed between the upper wall 12 of the tank body 11 and the floor panel 20, whereby transmission of vibration from the floor panel 20 to the tank body 11 is suppressed.

As described above, since the intermediate portions of the upper wall 12 and the lower wall 13 of the synthetic resin-made tank body 11 of the fuel tank T are coupled by the five coupling portions 11a, even in case that the internal pressure of the tank body 11 increases or decreases, it is possible to prevent effectively the upper wall 12 and the lower wall 13 from deforming in the direction where the walls separate from each other or come close to each other.

Further, when the four corners of the tank body 11 are fixed by the four first plate-shaped attachment members 17, and the intermediate portion of the tank body 11 is fixed by the five second plate-shaped attachment member 18, the lower wall 13 of the tank body 11 is supported by the underside support parts 17a of the first plate-shaped attachment members 17 and the underside support parts 18a of the second plate-shaped attachment members 18. Therefore, not only a fall of the fuel tank T can be surely prevented, but also it is possible to prevent more surely the tank body 11 from expanding in the up-and-down direction when the internal pressure of the tank body 11 increases, and it is possible to prevent the intermediate portion of the tank body 11 from being weighed down with the weight of fuel.

Further, the first plate-shaped attachment member 17 and the second plate-shaped attachment member 18 have such the shape so as to meet the shape of the tank body 11. Since the first plate-shaped attachment member 17 comes into contact with two side walls of the tank body 11 that are orthogonal to each other, and the second plate-shaped attachment member 18 comes into contact with the annular side wall of the opening 11b in the coupling portion 11a of the tank body 11, when the load in the horizontal direction is applied to the tank body 11 in a sudden start of a vehicle, a sudden stop thereof, or a crash thereof, it is possible to prevent surely the fuel tank T from shifting in the horizontal direction. Further, since the first and second plate-shaped attachment members 17 and 18 are higher in degree of freedom in layout than the conventional support band, the influence on the attachment position of the fuel pump unit 14 can be suppressed to the minimum.

Though the embodiment of the present invention has been described above, various changes in design may be made without departing from the spirit of the present invention.

Figure 6:
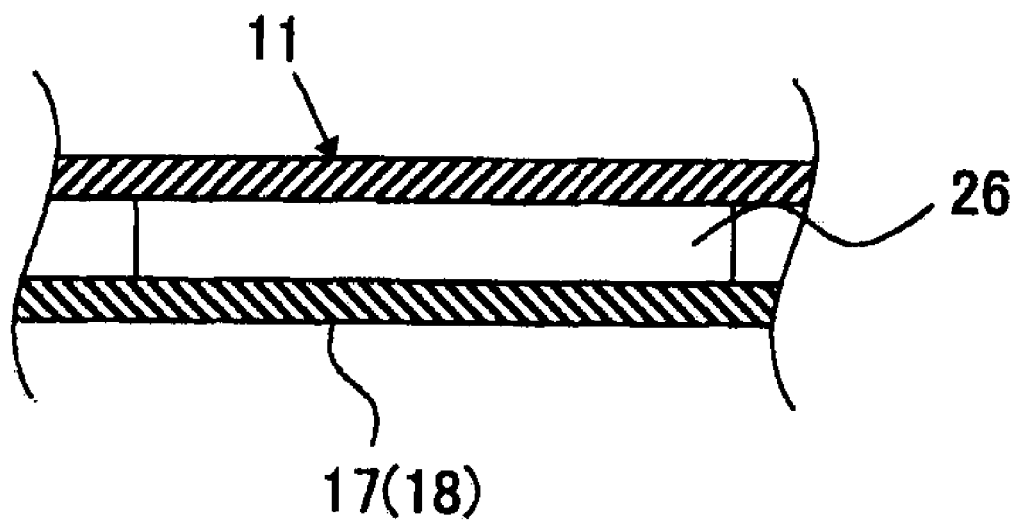
FIG. 6 is a partially enlarged view of an alternate implementation of the fuel tank fixing structure.

For example, though the fuel tank T in the embodiment is made of synthetic resin, the present invention can be applied also to a metal-made fuel tank. Particularly, in case that the tank body 11 is made of metal, a cushioning member such as a rubber can be interposed between the tank body 11 and the first and second plate-shaped attachment members 17 and 18, as shown in FIG. 6, whereby not only rust of the tank body 11 due to a friction but also transmission of noise (operating noise of pump or flowing noise of fuel) from the fuel tank can be prevented.

Further, though both of the first and second plate-shaped attachment members 17 and 18 are provided in the embodiment, only either of them may be provided.

Further, the number of the first and second plate-shaped attachment members 17 and 18 is not limited to that in the embodiment, but it can change arbitrarily.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A fuel tank fixing structure for a low-profile fuel tank comprising:
    an attachment member formed so as to fit the fuel tank, wherein the attachment member supports a lower wall of the fuel tank from below and contacts the fuel tank at least at a part of a side wall of the fuel tank, and the attachment member is fixed to an underside portion of a vehicle body; and
    a coupling portion coupling the upper wall and the lower wall at an intermediate portion of the fuel tank, wherein the attachment member contacts the fuel tank at a circumference of the coupling portion, and the attachment member is fixed to the underside portion of the vehicle body with a bolt penetrating both the attachment member and the coupling portion.

2. The fuel tank fixing structure for a low-profile fuel tank according to claim 1, wherein the attachment member comprises:
    an annular underside support part that comes into contact with the lower wall of the fuel tank at the circumference of the coupling portion;
    a conical side support part that comes into contact with the coupling portion; and
    a ceiling wall that blocks the upper end of the conical side support part,
    further wherein the attachment member is fixed to the underside portion of the vehicle body with a bolt penetrating the ceiling wall.

3. The fuel tank fixing structure for a low-profile fuel tank according to claim 1, wherein the underside portion of the vehicle body includes a body frame to which the attachment member is fixed.

4. The fuel tank fixing structure for a low-profile fuel tank according to claim 1, wherein the underside portion of the vehicle body comprises:
    an attachment bracket to which the attachment member is fixed; and
    a floor panel to which the attachment bracket is fixed at an undersurface thereof.

5. The fuel tank fixing structure for a low-profile fuel tank according to claim 1, further comprising a cushioning member for suppressing a transmission of a vibration to or from the fuel tank wherein the cushioning member is interposed between the upper wall of the fuel tank and a floor panel of the vehicle body.

6. The fuel tank fixing structure for a low-profile fuel tank according to claim 1, further comprising a cushioning member for suppressing a transmission of a vibration to or from the fuel tank, wherein the cushioning member is interposed between the fuel tank and the attachment member.

7. A vehicle comprising:
    a low-profile fuel tank; and
    a fuel tank fixing structure according to claim 1 coupled to the low-profile fuel tank.

8. The fuel tank fixing structure for a low-profile fuel tank according to claim 1, wherein the attachment member comprises:
    an underside support part that comes into contact with the lower wall at a corner of the fuel tank;
    a side support part that comes into contact with two side walls of the fuel tank adjacent to each other; and
    a flange part,
    further wherein the attachment member is fixed to the underside portion of the vehicle body with a bolt penetrating the flange part.

9. A fuel tank fixing structure for a low-profile fuel tank comprising:
    an attachment member formed so as to fit the fuel tank, wherein the attachment member supports a lower wall of the fuel tank from below and is brought into contact with the fuel tank at least at a part of a side wall of the fuel tank, and the attachment member is fixed to an underside portion of a vehicle body; and
    a cushioning member for suppressing a transmission of a vibration to or from the fuel tank wherein the cushioning member is interposed between the upper wall of the fuel tank and a floor panel of the vehicle body.

10. The fuel tank fixing structure for a low-profile fuel tank according to claim 9 comprising a coupling portion that couples the upper wall and the lower wall at an intermediate portion of the fuel tank, wherein the attachment member contacts the fuel tank at a circumference of the coupling portion, and the attachment member is fixed to the underside portion of the vehicle body with a bolt penetrating both the attachment member and the coupling portion.

11. The fuel tank fixing structure for a low-profile fuel tank according to claim 9 wherein the attachment member comprises:
    an underside support part that contacts the lower wall at a corner of the fuel tank;
    a side support part that contacts two side walls of the fuel tank adjacent to each other; and
    a flange part,
    further wherein the attachment member is fixed to the underside portion of the vehicle body with a bolt penetrating the flange part.

12. The fuel tank fixing structure for a low-profile fuel tank according to claim 10 wherein the attachment member comprises:
    an annular underside support part contacts the lower wall of the fuel tank at the circumference of the coupling portion;
    a conical side support part contacts the coupling portion; and
    a ceiling wall that blocks the upper end of the conical side support part,
    further wherein the attachment member is fixed to the underside portion of the vehicle body with a bolt penetrating the ceiling wall.

13. The fuel tank fixing structure for a low-profile fuel tank according to claim 9 wherein the underside portion of the vehicle body includes a body frame to which the attachment member is fixed.

14. The fuel tank fixing structure for a low-profile fuel tank according to claim 9 wherein the underside portion of the vehicle body comprises:
    an attachment bracket to which the attachment member is fixed; and
    a floor panel to which the attachment bracket is fixed at an undersurface thereof.

15. A vehicle comprising:
a low-profile fuel tank; and
a fuel tank fixing structure according to claim 9 coupled to the low-profile fuel tank.

16. A fuel tank fixing structure for a low-profile fuel tank comprising:
an attachment member formed so as to fit the fuel tank, wherein the attachment member supports a lower wall of the fuel tank from below and is brought into contact with the fuel tank at least at a part of a side wall of the fuel tank, and the attachment member is fixed to an underside portion of a vehicle body; and
a cushioning member for suppressing a transmission of a vibration to or from the fuel tank, wherein the cushioning member is interposed between the fuel tank and the attachment member.

17. The fuel tank fixing structure for a low-profile fuel tank according to claim 16 comprising a coupling portion that couples the upper wall and the lower wall at an intermediate portion of the fuel tank, wherein the attachment member contacts the fuel tank at a circumference of the coupling portion and the attachment member is fixed to the underside portion of the vehicle body with a bolt penetrating both the attachment member and the coupling portion.

18. The fuel tank fixing structure for a low-profile fuel tank according to claim 16 wherein the attachment member comprises:
an underside support part that contacts the lower wall at a corner of the fuel tank;
a side support part that contacts two side walls of the fuel tank adjacent to each other; and
a flange part,
further wherein the attachment member is fixed to the underside portion of the vehicle body with a bolt penetrating the flange part.

19. The fuel tank fixing structure for a low-profile fuel tank according to claim 17, wherein the attachment member comprises:
an annular underside support part that contacts the lower wall of the fuel tank at the circumference of the coupling portion;
a conical side support part that contacts the coupling portion; and
a ceiling wall that blocks the upper end of the conical side support part,
further wherein the attachment member is fixed to the underside portion of the vehicle body with a bolt penetrating the ceiling wall.

20. The fuel tank fixing structure for a low-profile fuel tank according to claim 16, wherein the underside portion of the vehicle body includes a body frame to which the attachment member is fixed.

21. The fuel tank fixing structure for a low-profile fuel tank according to claim 16, wherein the underside portion of the vehicle body comprises:
an attachment bracket to which the attachment member is fixed; and
a floor panel to which the attachment bracket is fixed at an undersurface thereof.

22. A vehicle comprising:
a low-profile fuel tank; and
a fuel tank fixing structure according to claim 16 coupled to the low-profile fuel tank.

* * * * *